US007148303B2

(12) United States Patent
Gronowski et al.

(10) Patent No.: US 7,148,303 B2
(45) Date of Patent: Dec. 12, 2006

(54) BUTYL-TYPE RUBBER WITH HIGH HARDNESS

(75) Inventors: Adam Gronowski, Sarnia (CA); Akhtar Osman, Sarnia (CA)

(73) Assignee: Lanxess Inc., Sarnia (CA)

( * ) Notice: Subject to any disclaimer, the term of this patent is extended or adjusted under 35 U.S.C. 154(b) by 0 days.

(21) Appl. No.: 11/058,839

(22) Filed: Feb. 16, 2005

(65) Prior Publication Data

US 2005/0187365 A1   Aug. 25, 2005

(30) Foreign Application Priority Data

Feb. 23, 2004   (CA) .................................. 2458277

(51) Int. Cl.
  *C08F 236/20* (2006.01)
(52) U.S. Cl. .................. 526/336; 526/308; 526/348.7; 524/554; 524/573
(58) Field of Classification Search ................ 526/336, 526/348.7, 308; 524/554, 573
See application file for complete search history.

(56) References Cited

U.S. PATENT DOCUMENTS

| 2,368,538 | A | * | 1/1945 | Gleason et al. ............ 526/237 |
| 2,773,052 | A | * | 12/1956 | Cohen et al. ............... 526/237 |
| 2,781,334 | A | * | 2/1957 | Welch et al. ............... 526/237 |
| 3,004,953 | A | | 10/1961 | Sonnabend .................. 260/62 |
| 3,067,182 | A | | 12/1962 | Jones ......................... 260/87.5 |
| 4,499,248 | A | | 2/1985 | Jalics ......................... 526/173 |

FOREIGN PATENT DOCUMENTS

| CA | 2 386 646 | 7/2003 |
| CA | 2 386 628 | 11/2003 |
| EP | 1 099 717 | 5/2001 |

OTHER PUBLICATIONS

"Makromol. Chem.", 183, pp. 2787-2797 (1982), "Anionic Polymerization and Copolymerization of 1,3- and 1,4-Diisopropenylbenzene" Lutz, Beinert, Rempp.
J. Polymer Sci., 28, 195 (1958), pp. 629-631 "The Preparation and Structure of Linear Polymers from Di-isopropenylbenzenes", Cooper, Dunlop Research Centre.
Journal of Applied Polymer Science, vol. 8, pp. 521-526 (1961) "New Catalysts for the Polymeri-Zation of Diisopropenylbenzes", D'Onofrio, A.A.
"New Monomers and Polymers", B. Culbertson and C. Pittman (Eds.), Plenum Press, New York, 1984, pp. 415-428 "Synthesis of Copolymers of $_m$-Diisopropenylbenzene and $_m$-Dimethoxybenzene" R.A. Smith et al, (1995) The Goodyear Tire and Rubber Company, Akron, Ohio.
Macromol. Symp. 95, pp. 39-56 (1995) "Multi-Arm Star Polyisobutylenes" Kennedy, et al.

* cited by examiner

*Primary Examiner*—Fred Teskin
(74) *Attorney, Agent, or Firm*—Jennifer R. Seng

(57) ABSTRACT

The present invention relates to an elastomeric polymer having repeating units derived from at least one isomonoolefin monomer, at least one multiolefin monomer, at least one diisoalkenylbenzene monomer, and optionally further copolymerizable monomers, wherein the polymer has a Mooney viscosity (ML 1+8@125° C. according to ASTM D1646) of less than 40 units and a Shore A hardness higher than 65 points @ 23° C. (according to ASTM D2240) as well as a curable composition containing the elastomeric polymer and a shaped article manufactured from the curable composition.

7 Claims, No Drawings

BUTYL-TYPE RUBBER WITH HIGH HARDNESS

FIELD OF THE INVENTION

The present invention relates to an elastomer having repeating units derived from at least one isomonoolefin monomer, at least one multiolefin monomer, at least one diisoalkenylbenzene monomer, and optionally further copolymerizable monomers, wherein the elastomer has a Mooney viscosity (ML 1+8@125° C. according to ASTM D1646) of less than 40 units and a Shore A hardness higher than 65 points @ 23° C. (according to ASTM D2240) as well as a curable composition containing the elastomer and a shaped article manufactured from the curable composition.

BACKGROUND OF THE INVENTION

In many of its applications, isoolefin copolymers, in particular butyl rubber is used in the form of cured compounds.

Rubbery copolymers of isoolefins of 4 to 7 carbon atoms, such as isobutylene, and aliphatic dienes of 4 to 14 carbon atoms, such as isoprene or butadiene, are known by the generic name of "butyl rubbers" (IIR).

Such materials usually have a long chain, linear molecular structure and a rather low level of chemical unsaturation provided by the aliphatic diene. These two characteristics contribute to their typical properties of good resistance to the degradative action of oxygen, ozone, acids, alkalis, heat and sunlight, and low permeability to gases and vapors.

The level of unsaturation of butyl rubber is normally given in mole percent, i.e., the number of double bonds per 100 monomer units. Commercially available butyl grades from LANXESS usually have between 0.7 and 2.5%. For comparison, the degree of unsaturation of natural rubber and polybutadiene rubber is 100% and for SBR over 80%.

Butyl rubber can be manufactured by copolymerizing isobutylene and isoprene in methyl chloride diluent using aluminum chloride as a catalyst. This cationic polymerization is carried out in a continuous reactor at temperatures below −90° C. A solution process is also known, with a $C_5$–$C_7$ hydrocarbon as solvent and an aluminum alkylhalide catalyst.

The isoprene incorporated in IIR (ca. 0.5–2.5 mol %) provides double bonds, which allow the rubber to be vulcanized with sulfur and other vulcanizing agents. Butyl rubber and its vulcanizates are characterized by impermeability to air, high damping of low frequency vibrations, and good resistance to aging, heat, acids, bases, ozone and other chemicals. These characteristics lead to the use of butyl rubber in tire inner tubes, tire curing bladders and bags, vibration insulators, roof and reservoir membranes, pharmaceutical bottle stoppers and other applications.

Unsaturated rubbers, however, are subject to oxidation by chain scission. This process normally involves the unsaturated sites of the molecular chain. Therefore, a fewer number of such sensitive sites in the rubber result in improved oxidation resistance.

Butyl rubbers in its uncured state can be used in sealants and adhesives. The presence of unsaturation in the backbone of the base polymer may lead to yellowing of the adhesive and eventual crosslinking which makes the bond between the adhesive and the adhering material brittle. The higher the degree of unsaturation in the rubber, the more potential for undesirable changes.

Most applications of butyl rubber are based on its vulcanized compounds. The vulcanization or curing of copolymers of isoolefins and dienes is most commonly accomplished by sulfur curing agents, either sulfur itself or sulfur donors, in conjunction with such accelerators as thiazoles, for example, 2-mercapto benzothiazole, thiocarbamates, e.g., zinc dimethyl dithiocarbamate, thiurams, e.g., tetramethyl thiuram disulfide, and various others, for example diphenyl guanidine and aldehydeamines. Non-sulfur curing systems can also be used, for example quinoid systems involving the use of such compounds as p-quinone dioxime and p,p'-dibenzoylquinone dioxime in conjunction with activating compounds such as red lead; p-dinitroso benzene systems and resin cure systems involving the use of such compounds as polychloroprene and brominated dimethylol phenyl resins.

For some specific applications, compounds with high hardness are needed. For example, this is the case with the printing blankets for the dry offset cup, tube and lid printing markets.

Dry offset printing is similar to offset lithography. The role of a rubber blanket is to carry the image from the printing plate to the container surface. The plate has the image area raised above the surface of the plate, as in letterpress. Ink is distributed through a series of rollers and onto the raised surface of the plate. The plate transfers the image to the blanket, which then prints the entire multicolor copy on the container. One to ten colors can be printed in a single pass over the container, with all colors being applied simultaneously by the same blanket.

Varying blanket materials and blankets with different thickness are available for varying printing requirements on different products. One of these known materials for printing blankets is butyl rubber. The blanket is manufactured with a butyl rubber compound for optimum resistance to most UV and IR printing inks. For example, one type of products known in the marketplace has the rubber face purposely harder than the standard butyl and offering improved wear characteristics at higher speeds with better ink release and print quality. Such a printing blanket can be used for most applications, including lid printing and offers excellent solvent resistance.

The polymerization of diisopropenylbenzenes (DIPB's) was first reported over 45 years ago. Free radical initiated polymerizations produced crosslinked gels.

The use of an anionic technique made it possible to produce essentially linear, soluble polymer in which only one unsaturation site of each DIPB molecule was consumed. At low conversions, the aromatic ring of each pendant group carried an unreacted isopropenyl group ("Makromol. Chem.", 183, (2787 (1982), U.S. Pat. No. 4,499,248). Branching and crosslinking could occur at higher conversions (>50%).

The cationic polymerization of DIPB's was found to produce polymers containing predominantly a polyindane structure ("J. Polym. Sci.", 28, 629 (1958). The molecular weight increased in a stepwise manner with time and the overall process was kinetically more akin to a polycondensation than to a conventional vinyl polymerization. The continuation of the vinyl addition beyond the dimer stage led to crosslinked products.

D'Onofrio ("J. Appl. Polym. Sci." 8, 521 (1964) demonstrated that linear, high molecular weight, soluble polyindane was produced from diisopropenylbenzenes at polymerization temperature above 70° C. using a complex Lewis acid type initiating system (LiBu—$TiCl_4$—HCl). It was pointed out that with the use of $BF_3$, $TiCl_4$, $SnCl_4$, etc., a narrow polymerization range (70–100° C.) was necessary in order that soluble polymer was obtained. At temperatures below 70° C. crosslinked products resulted. At temperatures higher than 100° C., the activity of the catalyst decreased.

Sonnabend (U.S. Pat. No. 3,004,953) claimed a direct cationic copolymerization of diisopropenylbenzenes with phenol. The process was complicated by the simultaneous occurrence of propagation and alkylation reactions, with products exhibiting branching and ultimately gelation.

H. Colvin et al. described a direct cationic copolymerization of m-diisopropenylbenzene and m-dimethoxybenzene (in "New Monomers and Polymers", B. Culbertson and C. Pittman (Eds.), Plenum Press, New York 1984, 415–428). The dimethoxybenzene could be incorporated into the polymer backbone or as a pendant group. The most important variable in controlling the ration of mono- to dialkylated dimethoxybenzene was the catalyst. The $M_w$ of the polymer was below 50,000 g/mol and the properties were poor.

Copolymers of p- or m-diisopropenylbenzene with styrene exhibited unusually high melting points and increased chemical and heat resistance (Brit. 850, 363). These copolymers containing at least 5% of the difunctional monomer could be useful as moulding resins, adhesives, printing inks and as additives for lubricating oils to raise the viscosity index of the oil. The preferred catalyst was a cationic catalyst.

U.S. Pat. No. 3,067,182 discloses uniform copolymers of isopropenylbenzene chloride with isobutylene could be made under cationic copolymerization conditions at temperatures below −100° C. Such copolymers could be readily crosslinked with amines or phenols or by adding a Friedel-Crafts catalyst to obtain cure by self-alkylation.

Multi-arm star polyisobutylenes were prepared by the "arm-first" method ("Macromol. Symp.", 95, (1995) 39–56). This synthesis was accomplished by adding various linking agents ("core builders") such as p- and m-divinylbenzene and p- and m-diisopropenylbenzene (DIPB) to living $PIB^+$ charges and thus obtaining a crosslinked aromatic core holding together a corona of well-defined arms. The products were characterized in terms of overall arm/core composition, molecular weight and molecular weight distribution.

Star-shaped polymer, useful as viscosity modifier for lubricating oil, comprised poly(diisopropenylbenzene) as core with at least three polyisobutylene arms (EP 1099717 A). Polymerization occurred in the presence of titanium tetrachloride and pyridine (living polymerization).

Co-Pending Canadian Application ((int. docket no. POS 1153, filed September, 2003) refers to sulfur-curable copolymers of isobutylene and diisopropenylbenzene having high Mooney viscosity (ML 1'+8'@125° C.>80 units) in the absence of multiolefins. Further, this application is silent about high Shore A2 hardness of the cured compounds.

Co-pending applications CA-2,386,628 and CA-2,368, 646 provide a compound containing at least one elastomeric polymer containing repeating units derived from at least one $C_4$ to $C_7$ isomonoolefin monomer, at least one $C_4$ to $C_{14}$ multiolefin monomer or β-pinene, at least one multiolefin cross-linking agent and at least one chain transfer agent, said polymer containing less than 15 wt. % of solid matter insoluble within 60 min in cyclohexane boiling under reflux, at least one filler and a peroxide curing system. The multiolefin cross-linking agent can be a multiolefinic hydrocarbon compound. Examples of these are norbornadiene, 2-isopropenylnorbornene, 2-vinyl-norbornene, 1,3,5-hexatriene, 2-phenyl-1,3-butadiene, divinylbenzene, diisopropenylbenzene, divinyltoluene, divinylxylene or $C_1$ to $C_{20}$ alkyl-substituted derivatives of the above compounds.

A co-pending application filed with the Canadian Intellectual Property Office on Aug. 05, 2003 under the attorney docket POS 1142 CA provides a method of improving reversion resistance of a peroxide curable polymer containing at least one polymer having repeating units derived from at least one isomonoolefin monomer and at least one aromatic divinyl monomer by polymerizing the monomers in the presence of at least one m- or p-diisoalkenylbenzene compound. The present invention does not include the presence of aromatic divinyl monomers like divinylbenzene.

However, an elastomer having repeating units derived from at least one isomonoolefin monomer, at least one multiolefin monomer, at least one diisoalkenylbenzene monomer, and optionally further copolymerizable monomers, polymerized in the absence of aromatic divinyl monomers, wherein the elastomer has a Mooney viscosity (ML 1+8@125° C. according to ASTM D1646) of less than 40 units and a Shore A hardness higher than 65 points @ 23° C. (according to ASTM D2240) is unknown.

SUMMARY OF THE INVENTION

The present invention relates to an elastomer having repeating units derived from at least one isomonoolefin monomer, at least one multiolefin monomer, at least one diisoalkenylbenzene monomer, and optionally further copolymerizable monomers, polymerized in the absence of aromatic divinyl monomers, wherein the elastomer has a Mooney viscosity (ML 1+8@125° C. according to ASTM D1646) of less than 40 units and a Shore A hardness higher than 65 points @ 23° C. (according to ASTM D2240) preferably obtained directly via a cationic process. According to the present invention, the aromatic component does not introduce vinyl groups into main polymer chains.

It was surprisingly discovered that these elastomers could give sulfur-cured compounds with properties equivalent to those based on the conventional butyl rubber with a significantly higher isoprene content. Also, the novel polymers despite having Mooney viscosity values below 40 units, give compounds with high values (>65) of Shore A2 hardness to sulfur-cured compounds, which is not possible to achieve by increasing the content of isoprene in the isobutylene-isoprene copolymers.

This combination is significant as compounds with low Mooney viscosity values are better processable than polymers with higher Mooney viscosity values.

At the same time, a predominant portion (>50%) of the elastomer, according to the present invention, is soluble in a hydrocarbon solvent, such as cyclohexane under reflux for 60 min. This butyl-type rubber, according to the present invention, can be curable with sulfur curing agents. The present invention is useful in applications where other types of very high Shore A hardness rubber are used which are hard to process and do not display advantages typical for butyl polymer or polyisobutylene, such as e.g., NBR elastomers.

DETAILED DESCRIPTION OF THE INVENTION

The present invention preferably relates to butyl-like polymers. The terms "butyl rubber", "butyl polymer" and "butyl rubber polymer" are used throughout this specification interchangeably. While the prior art in using butyl rubber refers to polymers prepared by reacting a monomer mixture comprising a $C_4$ to $C_7$ isomonoolefin monomer and a $C_4$ to $C_{14}$ multiolefin monomer or β-pinene, the present invention relates to elastomeric polymers containing repeating units derived from at least one isomonoolefin monomer, at least one multiolefin monomer, at least one diisoalkenylbenzene monomer, and optionally further copolymerizable monomers, polymerized in the absence of aromatic divinyl monomers, wherein the polymer has a Mooney viscosity (ML 1+8@125° C. according to ASTM D1646) of less than 40 units and a Shore A hardness higher than 65 points @ 23° C. (according to ASTM D2240).

The present invention is not restricted to any particular isomonoolefin monomer, however $C_4$ to $C_7$ isomonoolefin monomers are preferred. Preferred $C_4$ to $C_7$ monoolefins include isobutylene, 2-methyl-1-butene, 3-methyl-1-butene, 2-methyl-2-butene, 4-methyl-1-pentene and mixtures thereof. The most preferred isomonoolefin monomer is isobutylene.

The present invention is not restricted to any particular diisoalkenylbenzene provided that the diisoalkenylbenzene is copolymerizable with the isoolefin and multiolefin monomer(s) present. Examples of suitable diisoalkenylbenzenes include the meta- or para-isomers of diisopropenylbenzene and dimethallylbenzene.

The monomer mixture further contains at least one multiolefin monomer, such as isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene.

Preferably, the monomer mixture to be polymerized contains in the range of from 65% to 98.98% by weight of at least one isomonoolefin monomer, in the range of from 0.01% to 15% by weight of at least one multiolefin monomer and in the range of from 0.01% to 20% by weight of at least one diisoalkenylbenzene monomer or a mixture thereof. When added copolymerizable comonomers are present, it will be apparent to the skilled in the art that the ranges given above will change and result in a total of all monomers of 100% by weight.

The monomer mixture may contain minor amounts of one or more additional polymerizable co-monomers. For example, the monomer mixture may contain a small amount of a styrenic monomer. Preferred styrenic monomers include p-methylstyrene, styrene, α-methyl-styrene, p-chlorostyrene, p-methoxystyrene, indene (including indene derivatives) and mixtures thereof. If present, it is preferred to use the styrenic monomer in an amount of up to 5.0% by weight of the monomer mixture. The values of the isomonoolefin monomer(s) will have to be adjusted accordingly to result again in a total of 100% by weight.

The use of even other monomers in the monomer mixture is possible provided, of course, that they are copolymerizable with the other monomers in the monomer mixture. The polymerization of the elastomeric polymer of the present invention is performed in the absence of aromatic divinyl monomers which are known to increase the Mooney viscosity significantly and will decrease processability.

The present inventive polymer has a Mooney viscosity ML (1+8@125° C.) of less than 40, preferably less than 35, more preferably less than 30 units.

The elastomer of the present invention can be prepared by a cationic process for polymerizing the monomer mixture. This type of polymerization is well known to the skilled in the art and usually includes contacting the reaction mixture described above with a catalyst system. Preferably, the polymerization is conducted at a temperature conventional in the production of butyl polymers—e.g., in the range of from −100° C. to +50° C. The polymer may be produced by polymerization in solution or by a slurry polymerization method. Polymerization is preferably conducted in suspension (the slurry method)—see, for example, Ullmann's Encyclopedia of Industrial Chemistry (Fifth, Completely Revised Edition, Volume A23; Editors Elvers et al., 290–292).

As an example, according to the present invention, the polymerization can be conducted in the presence of an inert aliphatic hydrocarbon diluent (such as n-hexane) and a catalyst mixture containing a major amount (in the range of from 80 to 99 mole percent) of a dialkylaluminum halide (for example diethylaluminum chloride), a minor amount (in the range of from 1 to 20 mole percent) of a monoalkylaluminum dihalide (for example isobutylaluminum dichloride), and a minor amount (in the range of from 0.01 to 10 ppm) of at least one of a member selected from the group comprising water, aluminoxane (for example methylaluminoxane) and mixtures thereof. Of course, other catalyst systems conventionally used to produce butyl polymers can be used to produce a butyl polymer which is useful herein—see, for example, "Cationic Polymerization of Olefins: A Critical Inventory" by Joseph P. Kennedy (John Wiley & Sons, Inc. © 1975, 10–12).

Polymerization may be performed both continuously and discontinuously. In the case of a continuous operation, the process is preferably performed with the following three feed streams:

I) solvent/diluent+isomonoolefin(s) (preferably isobutene)
II) diisoalkenylbenzene monomer(s), multiolefin monomer(s), and optionally, other copolymerizable monomers e.g., p-methylstyrene
Ill) catalyst In the case of discontinuous operation, the process may, for example, be performed as follows: the reactor, pre-cooled to the reaction temperature, is charged with solvent or diluent and the reactants. The initiator is then pumped in the form of a dilute solution in such a manner that the heat of polymerization may be dissipated without problem. The course of the reaction may be monitored by means of the evolution of heat.

The present inventive polymer may be compounded. The compound containing the present inventive polymer and at least one active or inactive filler. The filler is preferably:

highly dispersed silicas, prepared e.g., by the precipitation of silicate solutions or the flame hydrolysis of silicon halides, with specific surface areas of in the range of from 5 to 1000 $m^2/g$, and with primary particle sizes in the range of from 10 to 400 nm; the silica's can optionally also be present as mixed oxides with other metal oxides such as those of Al, Mg, Ca, Ba, Zn, Zr and Ti;

synthetic silicates, such as aluminum silicate and alkaline earth metal silicate like magnesium silicate or calcium silicate, with BET specific surface areas in the range of from 20 to 400 $m^2/g$ and primary particle diameters in the range of from 10 to 400 nm;

natural silicates, such as kaolin and other naturally occurring silica;

glass fibers and glass fiber products (matting, extrudates) or glass microspheres;

metal oxides, such as zinc oxide, calcium oxide, magnesium oxide and aluminum oxide;

metal carbonates, such as magnesium carbonate, calcium carbonate and zinc carbonate;

metal hydroxides, e.g. aluminum hydroxide and magnesium hydroxide;

carbon blacks; the carbon blacks to be used here are prepared by the lamp black, furnace black or gas black process and have preferably BET (DIN 66 131) specific surface areas in the range of from 20 to 200 m²/g, e.g. SAF, ISAF, HAF, FEF or GPF carbon blacks;

rubber gels, especially those based on polybutadiene, butadiene/styrene copolymers, butadiene/acrylonitrile copolymers and polychloroprene;

or mixtures thereof.

Examples of preferred mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the terpolymer. For many purposes, the preferred mineral is silica, especially silica made by carbon dioxide precipitation of sodium silicate. Dried amorphous silica particles suitable for use in accordance with the invention may have a mean agglomerate particle size in the range of from 1 to 100 microns, preferably between 10 and 50 microns and most preferably between 10 and 25 microns. It is preferred that less than 10 percent by volume of the agglomerate particles are below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trademarks HiSil® 210, HiSil® 233 and HiSil® 243 from PPG Industries Inc. Also suitable are Vulkasil® S and Vulkasil® N, from Bayer AG.

It might be advantageous to use a combination of carbon black and mineral filler in the inventive compound. In this combination the ratio of mineral fillers to carbon black is usually in the range of from 0.05 to 20, preferably 0.1 to 10. For the rubber composition of the present invention it is usually advantageous to contain carbon black in an amount of in the range of from 20 to 200 parts by weight, preferably 30 to 150 parts by weight, more preferably 40 to 100 parts by weight.

The compound further can contain at least one curing system, such as a sulfur curing system.

The present invention is not limited to a special sulfur curing system. For further reference, see, chapter 2, "The Compounding and Vulcanization of Rubber", of "Rubber Technology", 3$^{rd}$ edition, published by Chapman & Hall, 1995, the disclosure of which is incorporated by reference with regards to jurisdictions allowing for this procedure. The preferred amount of sulfur is from 0.3 to 2.0 parts by weight per hundred parts of rubber. An activator, for example zinc oxide, may also be used, in an amount of from 5 parts to 2 parts by weight. Other ingredients, for instance stearic acid, antioxidants, or accelerators may also be added to the elastomer prior to curing. Sulphur curing is then effected in known manner.

Even if it is not preferred, the compound may further comprise other natural or synthetic rubbers such as BR (polybutadiene), ABR (butadiene/acrylic acid-$C_1$–$C_4$-alkylester-copolymers), CR (polychloroprene), IR (polyisoprene), SBR (styrene/butadiene-copolymers) with styrene contents in the range of 1 to 60 wt %, NBR (butadiene/acrylonitrile-copolymers with acrylonitrile contents of 5 to 60 wt %, HNBR (partially or totally hydrogenated NBR-rubber), EPDM (ethylene/propylene/diene-copolymers), FKM (fluoropolymers or fluororubbers), and mixtures of the given polymers.

The compound described herein above can contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 wt. %, based on rubber. Preferably the composition furthermore contains in the range of 0.1 to 20 phr of an organic fatty acid, preferably an unsaturated fatty acid having one, two or more carbon double bonds in the molecule which more preferably includes 10% by weight or more of a conjugated diene acid having at least one conjugated carbon-carbon double bond in its molecule. Preferably those fatty acids have in the range of from 8 to 22 carbon atoms, more preferably 12–18. Examples include stearic acid, palmic acid and oleic acid and their calcium-, zinc-, magnesium-, potassium- and ammonium salts.

The ingredients of the final compound can be mixed together, suitably at an elevated temperature that may range from 25° C. to 200° C. Normally the mixing time does not exceed one hour and a period of time from 2 to 30 minutes is usually adequate. The mixing is suitably carried out in an internal mixer such as a Banbury mixer, or a Haake or Brabender miniature internal mixer. A two roll mill mixer also provides a good dispersion of the additives within the elastomer. An extruder also provides good mixing, and permits shorter mixing times. It is possible to carry out the mixing in two or more stages, and the mixing can be done in different mixing devices, for example the first stage in an internal mixer and the second one in an extruder. However, it is important that no unwanted pre-crosslinking (=scorch) occurs during the mixing stage. For compounding and vulcanization see also: Encyclopedia of Polymer Science and Engineering, Vol. 4, p. 66 et seq. (Compounding) and Vol. 17, p. 666 et seq. (Vulcanization).

The polymer prepared according to the present inventive method and a compound containing the polymer is useful for the manufacture of shaped rubber parts, such as printing rollers, containers, tubes and bags for non-medical applications, parts of electronic equipment, in particular insulating parts, parts of containers containing electrolytes, rings, dampening devices, seals and sealants or shaped rubber parts either solid, foamed, or fluid-filled useful to isolating vibrations and dampening vibrations generated by mechanical devices.

The present invention is further illustrated by the following examples.

EXAMPLES

Methyl chloride (Dow Chemical) serving as a diluent for polymerization and isobutylene monomer (Matheson, 99%) were transferred into a reactor by condensing a vapor phase.

Aluminum chloride (99.99%), isoprene (99%) and m-diisopropenylbenzene (97%) were from Aldrich. The inhibitor was removed from isoprene by using an inhibitor removing disposable column from Aldrich.

The mixing of a compound with carbon black (IRB #7) and curatives was done using a miniature internal mixer (Brabender MIM) from C. W. Brabender, consisting of a drive unit (Plasticorder® Type PL-V151) and a data interface module.

The Mooney viscosity test was carried out according to ASTM standard D-1646 on a Monsanto MV 2000 Mooney viscometer ML (1+8 @125° C.).

The Moving Die Rheometer (MDR) test was performed according to ASTM standard D-5289 on a Monsanto MDR 200 (E). The upper die oscillated through a small arc of 1 degree.

The solubility of a polymer was determined after the sample refluxed in cyclohexane over 60-minute period.

Curing was done using an Electric Press equipped with an Allan-Bradley Programmable Controller.

Stress-strain tests were carried out using the Instron Testmaster Automation System, Model 4464.

EXAMPLE 1 (COMPARATIVE)

To a 250 mL Erlenmeyer flask, 0.63 g of $AlCl_3$ was added, followed by 140 mL of methyl chloride at −30° C. The resulting solution was stirred for 30 min at −30° C. and then cooled down to −95° C., thus forming the catalyst solution.

To a 2000 mL glass reactor equipped with an overhead stirrer, 900 mL of methyl chloride at −95° C. was added, followed by 120.0 mL of isobutylene at −95° C. and 6.0 mL of isoprene at room temperature. The reaction mixture was brought to −95° C. and 20 mL of the catalyst solution was added to start the reaction.

The polymerization was carried out in MBRAUN® dry box under the atmosphere of dry nitrogen. The reaction was terminated after 10 minutes by adding into the reaction mixture 10 mL of ethanol containing some sodium hydroxide.

The obtained polymer (Polymer 1) was coagulated with steam and dried to a constant weight in the vacuum oven at 70° C. The yield of the reaction was 78.3%. The Mooney viscosity of the rubber was 42.6 units (ML1'+8'@125° C. ). The solubility of the rubber in cyclohexane was 99.9%. The copolymer contained 2.49 mol % of isoprene.

EXAMPLE 2

The reaction described in Example 1 was repeated except 2.2 mL of isoprene was added instead of 6.0 mL and also 2.4 mL of m-diisopropenylbenzene was present besides 120 mL isobutylene in the monomer feed.

The obtained polymer (Polymer 2) was coagulated with steam and dried to a constant weight in the vacuum oven at 70° C. The yield of the reaction was 90.7%. The Mooney viscosity of the rubber was 32.4 units (ML1'+8'@125° C.). The solubility of the rubber in cyclohexane was 98.7%. The terpolymer contained 0.94 mol % of isoprene and 0.49 mol % of the aromatic monomer.

EXAMPLE 3

The polymers described in Example 1 and 2 were compounded using the following recipe:
Polymer: 100 phr
Carbon black N330: 50 phr
Stearic acid (Emersol 132 NF): 1.0 phr
Zinc oxide (Kadox 920): 3.0 phr
Sulfur NBS: 1.75 phr
Methyl Tuads (TMTD): 1.0 phr The mixing was performed in a Brabender internal mixer (capacity ca. 75 cc.) The starting temperature was 30° C. and the mixing speed 50 rpm.

The following steps were carried out:
0 min: polymer added, followed by carbon black and stearic acid
3 min: sweep
3.5 min: ZnO added, followed by sulfur and TMTD
7 min: mix removed The compound was passed six times through a mill (6"×12") with a tight nip gap.

The obtained compound was tested using the Moving Die Rheometer (MDR). Also, after curing at 160° C. it was tested for stress-strain properties.

The results are given in Table 1.

TABLE 1

Properties of Compound 1 and Compound 2, based on Polymer 1 and Polymer 2, respectively.

| Compound | Isoprene in the raw polymer (mol %) | MDR Δ torque (dN · m) | Shore A2 Hardness (pts.) | Stress-strain Ultim. Tensile (MPa) | Ultim. Elong. (%) | Stress @ 300% (MPa) |
|---|---|---|---|---|---|---|
| Compound 1 (IB-IP) | 2.49 | 20.67 | 61 | 15.31 | 503 | 7.84 |
| Compound 2 (IB-IP-m-di-IPB) | 0.94 | 15.67 | 61 | 13.23 | 516 | 7.70 |

These results show that the above terpolymers gave compounds with very similar stress-strain properties and identical values of Shore A2 hardness like those based on conventional butyl rubber, although the content of isoprene in the terpolymers was lower by 1.55 mol % than in the respective butyl copolymer.

To demonstrate the effect of isoprene and m-diisopropenylbenzene present in the rubber on Shore A2 hardness of the compounds, one more copolymer and one terpolymer were synthesized.

EXAMPLE 4

The reaction described in Example 1 was repeated except 12.0 mL of isoprene was present together with 120 mL of isobutylene in the monomer feed.

The obtained polymer (Polymer 4) was coagulated with steam and dried to a constant weight in the vacuum oven at 70° C. The yield of the reaction was 70.4%. The solubility of the rubber in cyclohexane was 98.2%. The copolymer contained 4.68 mol % of isoprene.

Polymer 4 was compounded and tested as described in Example 3. The value of Shore A2 hardness of the compound was 62 points. The results are compared in Table 2.

EXAMPLE 5

The reaction described in Example 2 was repeated except 6.5 mL of m-diisopropenylbenzene was present in the monomer feed, together with 120 mL of isobutylene and 2.2 mL of isoprene.

The obtained polymer (Polymer 5) was coagulated with steam and dried to a constant weight in the vacuum oven at 70° C. The reaction was terminated after 15 min. The yield of the reaction was 91.5%. The Mooney viscosity of the rubber was 24.4 units (ML1'+8'@125° C.). The solubility of the rubber in cyclohexane was 69.3%.

Polymer 5 was compounded and tested as described in Example 3. The value of Shore A2 hardness of the compound was 69 points. The results are compared in Table 2.

TABLE 2

Comparison of Shore A2 hardness for Compounds 1, 4 and 5.

| Compound | Isoprene in the monomer feed (mL) | Isoprene in the polymer (mol %) | MDR Δ torque (dN · m) | Shore A2 Hardness (pts.) |
|---|---|---|---|---|
| Compound 1 (IB-IP) | 6.0 | 2.49 | 20.67 | 61 |
| Compound 4 (IB-IP) | 12.0 | 4.68 | 23.65 | 62 |
| Compound 5 (IB-IP-m-di-IPB) | 2.2 | n/a | 16.66 | 69 |

Note
n/a—not analyzed.

Even though the isoprene content in the Polymer 4 was high (4.68 mol %, considerably outside the commercial range) and the value of delta torque for the corresponding compound was high, the value of Shore A2 hardness was just 62 points. This indicates that there are limitations in raising the Shore A2 hardness of the compounds based on regular butyl rubber by increasing the amount of isoprene incorporated into the rubber.

On the other hand, the Polymer 5 obtained at a relatively low content of isoprene in the monomer feed and having the Mooney viscosity of just under 25 units gave a compound with the highest value of the Shore A2 hardness among the materials tested here.

For Examples 6 and 7, Divinylbenzene (ca, 63.5%, Dow Chemical) was purified by using an inhibitor removing disposable column from Aldrich.

EXAMPLE 6 (COMPARATIVE)

To a 250 mL Erlenmeyer flask, 0.45 g of $AlCl_3$ was added, followed by 100 mL of MeCl at —30 deg. C. The resulting solution was stirred for 30 min at –30 deg. C. and then cooled down to –95 deg. C., thus forming the catalyst solution.

To a 2000 mL glass reactor equipped with an overhead stirrer, 900 mL of methyl chloride at –95 deg. C. was added, followed by 120.0 mL of isobutylene at –95 deg. C., 3.6 mL of isoprene at room temperature and finally 4.8 mL of DVB at room temperature. The reaction mixture was brought to –95 deg. C. and 10 mL of the catalyst solution was added to start the reaction. The polymerization was carried out in MBRAUN dry box under the atmosphere of dry nitrogen. The reaction was terminated after 10 minutes by adding into the reaction mixture 10 mL of ethanol containing some sodium hydroxide.

The obtained polymer (Polymer A) was coagulated with steam and dried to a constant weight in the vacuum oven at 70 deg. C. The yield of the reaction was 76.7%. The Mooney viscosity of the product was 58.8 units (ML1'+8'@125 deg. C.). The solubility of the rubber in cyclohexane was 11.9%.

EXAMPLE 7 (COMPARATIVE)

The reaction described in Example 6 was repeated except 2.4 mL of DVB was added instead of 4.8 mL.

The obtained polymer (Polymer B) was coagulated with steam and dried to a constant weight in the vacuum oven at 70 deg. C. The yield of the reaction was 74.9%. The Mooney viscosity of the product was 75.3 units (ML1'+8'@125 deg. C.). The solubility of the rubber in cyclohexane was 10.6%.

EXAMPLE 8

The reaction described in Example 6 was repeated except no DVB was present this time and instead of DVB 3.84 mL of m-DilPB was added to the reactor.

The obtained polymer (Polymer C) was coagulated with steam and dried to a constant weight in the vacuum oven at 70 deg. C. The yield of the reaction was 86.6%. The Mooney viscosity of the product was 39.0 units (ML1'+8'@125 deg. C.). The solubility of the rubber in cyclohexane was 82.8%.

In the last example, the molar content of m-DilPB in the reactor was in-between the molar content of DVB in Examples 6 and 7. One can see that the Polymer C has very different properties than Polymers A and B. In particular, its Mooney viscosity is less than 40 units while the other two polymers have MV above 58 units. Also, the content of a soluble fraction in Polymer C is very different from that in Polymers A and B.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. An elastomeric polymer comprising repeating units derived from at least one isomonoolefin monomer, at least one multiolefin monomer, at least one diisoalkenylbenzene monomer, and optionally further copolymerizable monomers, wherein the elastomer does not comprise aromatic divinyl monomers, wherein the polymer has a Mooney viscosity (ML 1+8@125° C. according to ASTM D1646) of less than 40 units and a Shore A hardness higher than 65 points @23° C. (according to ASTM D2240).

2. An elastomeric polymer according to claim 1, wherein the isomonoolefin monomer(s) are selected from the group consisting of isobutylene, 2-methyl-1-butane, 3-methyl-1-butene, 2-methyl-2-butene, 4-methyl-1-pentene and mixtures thereof.

3. An elastomeric polymer according to claim 1, wherein the diisoalkenylbenzene compound is m- or p-diisopropenylbenzene, m- or p-dimethallylbenzene or mixture thereof.

4. An elastomeric polymer according to claim 1, wherein the multiolefin monomer(s) are selected from the group consisting of isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof.

5. A compound comprising an elastomeric polymer according to claim 1 and at least one filler and at least one curing system.

6. A compound according to claim 5, wherein the curing system is a sulfur curing system.

7. A cationic polymerization process for preparing an elastomeric polymer according to claim 1, comprising polymerizing at least one isomonolefin monomer, at least one multiolefin monomer and at least one diisoalkenylbenzene monomer in the presence of a catalyst, wherein the process does not comprise the presence of a aromatic divinyl monomer.

* * * * *